United States Patent [19]
Koudijs

[11] Patent Number: 5,322,087
[45] Date of Patent: Jun. 21, 1994

[54] DISCHARGE SYSTEM FOR COMBUSTION GASES

[76] Inventor: Philip R. Koudijs, Aan de Beuk 20, 6391 Al Landgraaf, Netherlands

[21] Appl. No.: 945,807

[22] Filed: Sep. 16, 1992

[30] Foreign Application Priority Data

Sep. 18, 1991 [NL] Netherlands ............... 9101570

[51] Int. Cl.$^5$ ............................................. F16K 11/00
[52] U.S. Cl. ................................ 137/875; 137/625.44
[58] Field of Search .......................... 137/875, 625.44; 60/39.182

[56] References Cited

U.S. PATENT DOCUMENTS

| | | |
|---|---|---|
| 2,227,666 | 1/1941 | Noack . |
| 2,713,245 | 7/1955 | Weaving . |
| 3,805,884 | 4/1974 | Burt et al. ............... 137/875 X |
| 3,897,773 | 8/1975 | Burt . |
| 4,351,361 | 9/1982 | Worley . |
| 4,821,507 | 4/1989 | Bachmann et al. ......... 137/875 X |
| 5,120,021 | 6/1992 | Squirrell et al. .......... 137/875 X |
| 5,186,205 | 2/1993 | Bachmann ................ 137/875 X |

FOREIGN PATENT DOCUMENTS

| | | |
|---|---|---|
| 1260356 | 9/1989 | Canada . |
| 8702138 | of 0000 | Fed. Rep. of Germany . |
| 2920608 | 5/1979 | Fed. Rep. of Germany . |
| 3504443 | 3/1987 | Fed. Rep. of Germany . |
| 8809458 | 12/0188 | PCT Int'l Appl. . |
| 2208427 | 3/1989 | United Kingdom . |

*Primary Examiner*—John C. Fox
*Attorney, Agent, or Firm*—Harness, Dickey & Pierce

[57] ABSTRACT

The invention relates to a discharge system for combustion gases of a gas turbine or the like, whereby one end of a discharge pipe is connected to the gas turbine or the like. The other end of the discharge pipe is connected to a heat exchanger. A branch pipe, which extends transversely to the discharge pipe, is connected to the discharge pipe. A valve mechanism is adjustable between a first position, in which the end of the branch pipe connecting to the discharge pipe is closed, and a second position, in which the discharge pipe is closed downstream of the connection of the branch pipe to the discharge pipe. The passage of the branch pipe is larger than that of the discharge pipe.

5 Claims, 1 Drawing Sheet

DISCHARGE SYSTEM FOR COMBUSTION GASES

The invention relates to a discharge system for combustion gases of a gas turbine or the like, whereby one end of the discharge pipe is connected to the gas turbine or the like, whilst the other end of the discharge pipe is connected to a heat exchanger or the like, and a branch pipe, which extends transversely to the discharge pipe, is connected to said discharge pipe, a valve means being disposed near the connection of the branch pipe to the discharge pipe, said valve means being pivotable about a pivot axis between a first position, in which the end of the branch pipe connecting to the discharge pipe is closed by the valve means extending at least substantially perpendicularly to the central axis of the branch pipe, and a second position, in which the discharge pipe is closed, the construction of the valve means being such that in the second position of the valve means at least part of an upstream boundary surface of the valve means, which extends into the discharge pipe from the side of the discharge pipe remote from the branch pipe, includes an angle deviating from 90° with the longitudinal axis of the discharge pipe, in such a manner, that parts of the boundary surface located near the side of the discharge pipe remote from the branch pipe are located further upstream than the parts of the boundary surface located further away from said side of the discharge pipe.

Such discharge systems are e.g. known from GB-A-2,208,427 and DE-A-3,504,443. With the construction according to DE-A-3,504,443 closing means are provided, on either side of the valve, at the end of the valve remote from the pivot pin. In the position in which the valve closes the branch pipe the end of the valve supporting the closing means is located in a recess located beside the branch pipe. With the construction according to GB-A-2,208,427 the end of the valve remote from the pivot pin co-operates, in the position in which said valve closes the branch pipe, with a section disposed in the branch pipe. In these prior embodiments the passage of the branch pipe is therefore smaller, at least near its connection to the discharge pipe, than that of the discharge pipe.

This relatively small diameter of the branch pipe makes for some additional resistance against the discharge of the combustion gases from the turbine, which experiences some resistance anyway as a result of the forced deflection of the gas flow upon being discharged through the branch pipe.

According to the invention the passage of the branch pipe is larger than the passage of the discharge pipe, and the valve means is provided with at least two sealing lips at its end remote from the pivot axis, one of said sealing lips being operative in the first position and the other being operative in the second position of the valve means, whereby the free end of the sealing lip being operative in said first position is located at a larger distance from the pivot axis than the free end of the sealing lip being operative in the second position.

By using the construction according to the invention an advantageous, comparatively large passage of the branch pipe may be accomplished in a simple manner, whilst an adequate sealing in both operating positions of the valve can be realised all the same.

The invention will be explained in more detail hereafter with reference to a few possible embodiments of the construction according to the invention diagrammatically illustrated in the accompanying figures.

Figure 1:
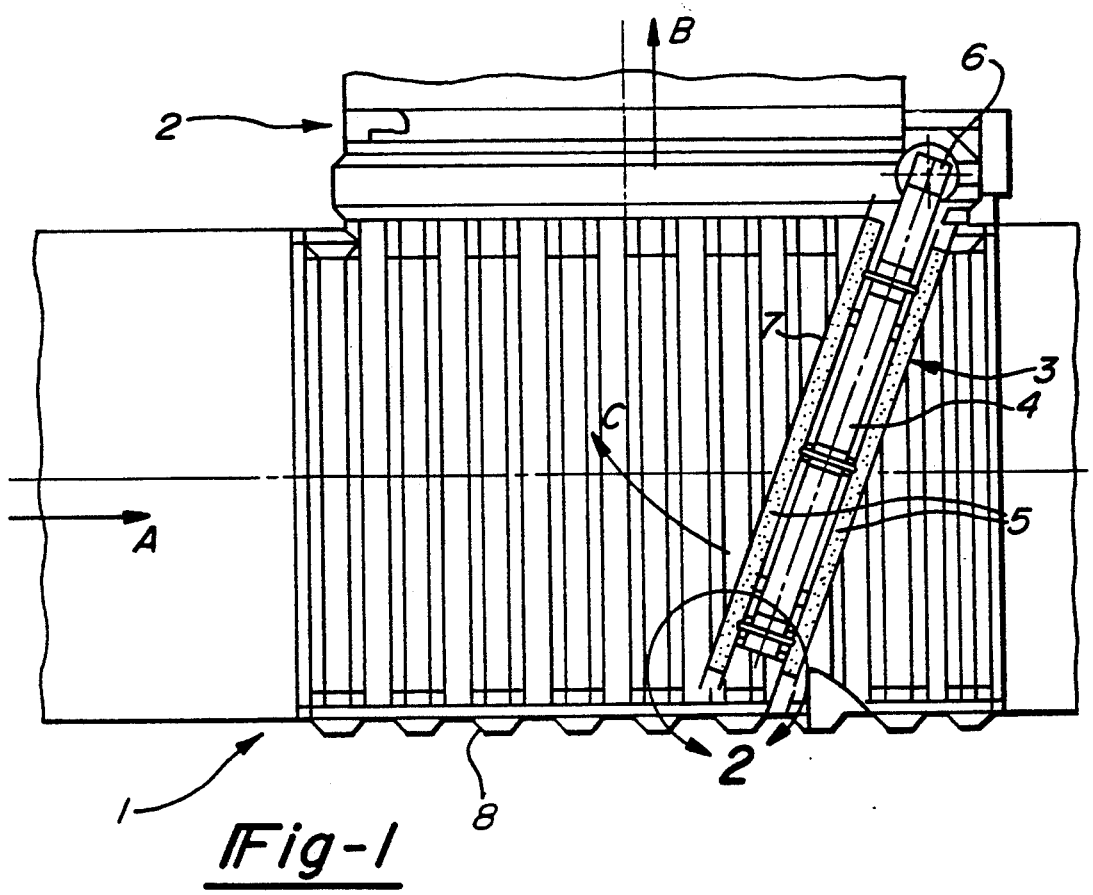
FIG. 1 is a diagrammatic sectional view of one embodiment of a discharge system according to the invention.

The discharge system shown in FIG. 1 comprises a discharge pipe 1 and a branch pipe 2 extending perpendicularly thereto, of which branch pipe 2 only the connecting piece to the discharge pipe 1 is illustrated in FIG. 1.

When seen in FIG. 1, the upstream end of the discharge pipe 1, which is located on the left in FIG. 1, will be in communication with a gas turbine or the like, whilst the downstream end of the discharge pipe 1 (only partly shown), located on the right in FIG. 1, will be connected to a heat exchanger or the like.

The discharge system shown in FIG. 1 is furthermore provided with a valve 3, which is built up of a frame 4, which on either side is lined with fire-resisting linings 5. As is apparent from FIG. 1, at the bottom side of the valve the lining located to the left of the frame 4 thereby projects beyond the lining 5 located on the right. The valve 3 is pivotable about a pivot pin 6 defining a pivot axis, which crosses the longitudinal axis of the discharge pipe 1 perpendicularly, said pivot pin being disposed downstream of the branch pipe 2, near the connection of said branch pipe 2 to the discharge pipe 1.

In the position shown in FIG. 1 the valve 3 closes the discharge pipe 1 downstream of the connection of the branch pipe 2 to the discharge pipe 1, so that combustion gases from the gas turbine, flowing through the discharge pipe 1 in the direction indicated by the arrow A, will be forced to flow out through the branch pipe 2 in the direction according to the arrow B.

As will be apparent from FIG. 1, in particular the upstream boundary surface 7 of the valve 3 slopes upwards into the discharge channel from the side 8 of the discharge channel remote from the branch pipe, in such a manner that the parts of the boundary surface 7 located near the side 8 are located further upstream than parts of the boundary surface 7 located further away from the side 8. In the illustrated embodiment the boundary surface 7 includes an angle of about 70° with the longitudinal axis of the discharge pipe 1.

It will be apparent that as a result of this sloping arrangement of the boundary surface 7 the gases flowing in the direction indicated by the arrow A will be gradually deflected in the direction of flow B.

Figure 2:
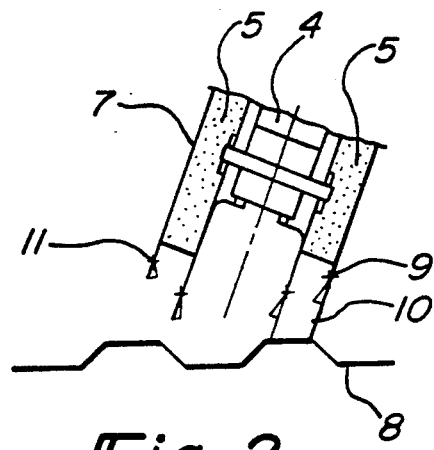
FIG. 2 is a larger-scale view of the boxed part II of FIG. 1.

As is shown in more detail in FIG. 2, sealing lips 9 are secured to the end of the valve 3 remote from the pivot pin 6, said sealing lips in the position illustrated in FIGS. 1 and 2 abutting against a U-shaped sealing section 10 attached to the side 8 of the discharge channel 1. As is furthermore apparent from FIG. 2, near the sealing lips 9 further sealing lips 11 are secured to the valve 3, said further sealing lips extending at least substantially parallel to the sealing lips 9 and beyond the ends of the lips 9, when seen from the pin 6.

In case it is desirable for the combustion gases to be supplied to the heat exchanger or the like connected to the upstream end of the discharge pipe 1, the valve 3 can be pivoted in the direction according to the arrow C, from the position shown in FIG. 1, into an at least substantially horizontal position, in which the valve 3 releases the passage through the discharge pipe 1 and closes the end of the branch pipe 2 connecting to the discharge pipe 1, whereby the above-mentioned sealing lips 11 come into operation by co-operation with sealing strips provided near said connection, and similar to sealing section 10.

It will be apparent that the dimension of the end of the branch pipe 2 connected to the discharge pipe 1 may be at least substantially equal to the dimension of the boundary surface 7 of the valve 3, which dimension is larger than that of the diameter of the discharge pipe 1. The fact that the dimension of the passage of the end of the branch pipe 2 connected to the discharge pipe 1 is larger than that of the diameter of the discharge pipe 1 itself, contributes substantially towards a rapid discharge of the combustion gases from the discharge pipe into the branch pipe.

Of course variations and/or additions to the above-described construction are possible within the spirit and scope of the invention.

I claim:

1. A discharge system for combustion gases of a gas turbine comprising:
    discharge pipe having first and second ends, said first end connected to the gas turbine, said second end of the discharge pipe connected to a heat exchanger;
    branch pipe having a passage larger than the passage of said discharge pipe extending transversely to said discharge pipe and being connected to said discharge pipe between said first and second ends;
    valve means disposed near the connection of said branch pipe to said discharge pipe, said valve means being pivotable about a pivot axis between a first position, in which said branch pipe is substantially sealed from said discharge pipe, and a second position, in which said discharge pipe is substantially sealed between said branch pipe and said second end, said valve means having a first upstream boundary surface in said second position which is presented to said combustion gases at an angle deviating from 90° with respect to the longitudinal axis of the discharge pipe such that parts of the boundary surface located near the side of the discharge pipe remote from the branch pipe are located further upstream than the parts of the boundary surface located further away from said side of the discharge pipe.

2. The discharge system of claim 1 wherein said valve means has in said first position a second upstream boundary surface presented to said combustion gases which is smaller in area than said first upstream boundary surface.

3. The discharge system of claim 2 further comprising sealing lips secured to said first and second upstream boundary surfaces wherein said sealing lips secured to said first upstream boundary surface are operative to seal said branch pipe in said second position and extend farther from said pivot axis than said sealing lips secured to said second upstream boundary surface which are operative to seal said discharge pipe in said second position.

4. A discharge system for combustion gases from a gas turbine comprising:
    discharge pipe having first and second ends, said first end communicating with the gas turbine, said second end communicating with a heat exchanger;
    branch pipe having a cross-sectional area larger than the cross sectional area of said discharge pipe, extending transversely to said discharge pipe, connected to said discharge pipe between said first and second ends;
    valve blade disposed near the connection of said branch pipe to said discharge pipe, said valve blade having first and second valve faces and being pivotable about a pivot axis between a first position in which said branch pipe is substantially sealed from said discharge pipe by the abutment of said first valve face to said branch pipe and a second position in which said discharge pipe is substantially sealed at said second end by abutment of said second valve face with said second end, said first valve face being presented to said combustion gases in said second position at an angle greater than 90° with respect to the longitudinal axis of said discharge pipe to assist in directing the flow of combustion gases towards said branch pipe, said first valve face having a larger area exposed to combustion gases in the second position than the area of the second face exposed to combustion gases in the first position.

5. The discharge system of claim 4 further comprising:
    sealing means secured to said first and second valve faces wherein said sealing means secured to said first valve face extend farther from said pivot axis than said sealing means secured to said second valve face.

* * * * *